Patented Jan. 26, 1932

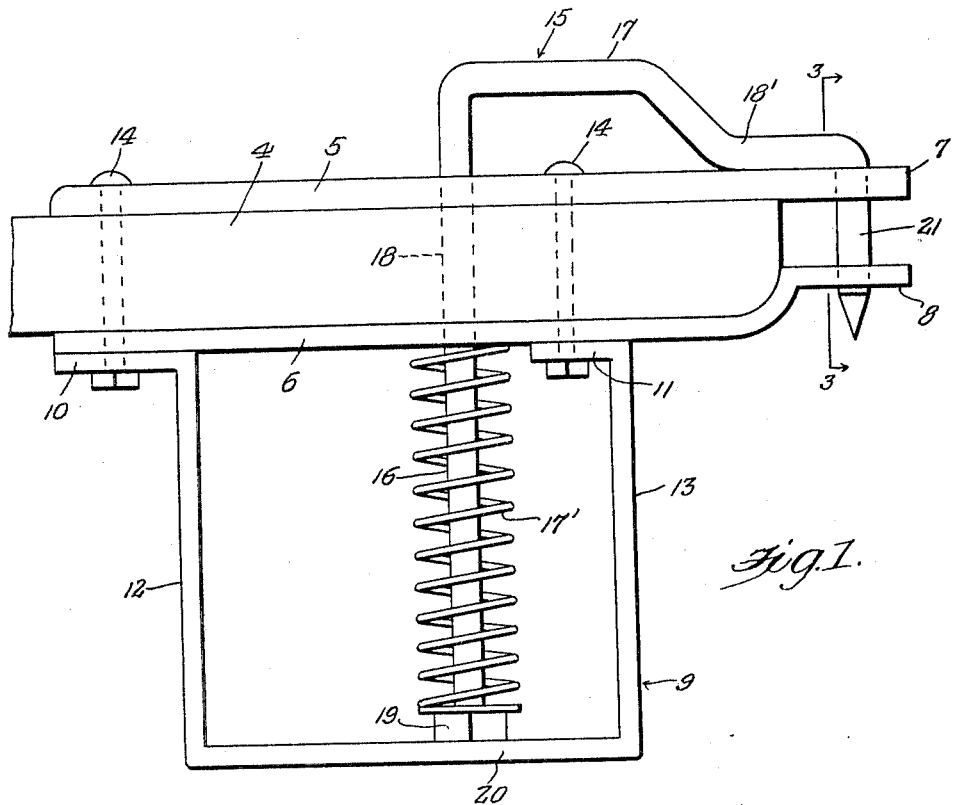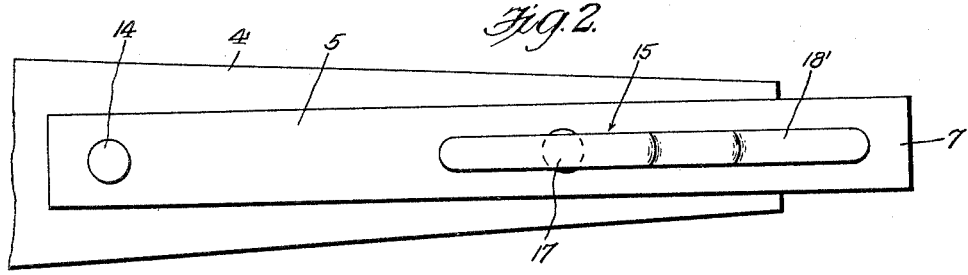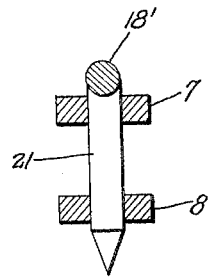

1,842,697

UNITED STATES PATENT OFFICE

NELLARD R. STENBERG AND EINAR ANDERSON, OF GROVE CITY, MINNESOTA

TRAILER HITCH AND STAND

Application filed April 8, 1930, Serial No. 442,601. Renewed November 5, 1931.

This invention relates to trailer hitches, and an object of the invention is to provide a trailer hitch for connecting a trailer to an automobile which will prevent the trailer from being detached from the automobile.

Another feature of the invention is to provide a guide on the hitch that serves as a stand for the tongues projecting from the automobile, so as to support the tongue in spaced relation to the ground, when the trailer is detached from the hitch.

Further objects of the invention are to provide a device of the character referred to that is strong, compact and durable, thoroughly reliable for its intended purpose, very simple in its method of assembly, and comparatively inexpensive to manufacture and install.

With the foregoing and other objects in view, the invention consists of a novel construction, and arrangement of parts as will be hereinafter more specifically described and illustrated in the accompanying drawings, wherein is disclosed an embodiment of the invention, but it is to be understood that changes, variations and modifications, may be resorted to without departing from the spirit of the claims hereto appended.

In the drawings, wherein like reference characters denote corresponding parts throughout the several views:—

Figure 1 is a fragmentary side elevation of the tongue projecting from an automobile showing an adaptation therewith of the invention, Fig. 2 is a top plan view thereof, and Fig. 3 is a vertical section taken substantially on the line 3—3 of Fig. 1, and looking in the direction of the arrows.

In the drawings, wherein for the purpose of illustration is shown the preferred embodiment of our invention, 4 represents a tongue which is secured to the rear of an automobile, in any suitable manner and is preferably rockably connected at its inner end thereto. A pair of plates 5, 6 are bolted to the upper and lower face of the tongue respectively, and on their rear ends are formed with extensions 7, 8 which project rearwardly from the outer end of the tongue 4.

These extensions are vertically spaced from each other, and are provided with alined apertures to receive the locking bolt to be presently described.

Depending from the lower plate 6 is an upright U-shaped frame 9 formed with flanges 10, 11 on the upper ends of the respective legs 12, 13. The frame 9 is bolted to the lower face of the plate 6 by the same bolts 14, 14, which secure the plates 5, 6 to the tongue 4.

The locking bolt is indicated generally at 15 and is angular in shape, being formed with a vertical leg 16 and a substantially horizontal leg 17.

An intermediate portion of the vertical leg 16 extends through a vertical opening 18. This opening 18 is formed by registering openings in the plate 5, the tongue 4, and the lower plate 6. The intermediate portion of the vertical leg 16 is rotatable as well as vertically movable in the opening 18.

Thus, on the lower portion of the vertical leg 16, which projects below the plate 6 is a helical coil spring 17', the lower end of which bears against a nut and washer 19 on the free lower end of the leg. The upper end of the coil spring 17' bears against the lower face of the plate 6.

Under tension of the coil spring 17' the end of the vertical leg 16 is held against the inner face of the bight portion 20 of the frame 9, so as to lock the bolt.

The leg 17 is formed on its outer end with a downset portion 18 that terminates in a depending vertical extension pin 21 that extends through the opening in the extensions 7, 8, the downset portion 18' providing a handle on the horizontal leg 17 between the vertical leg and this downset portion, so that the handle may be used to raise the locking bolt 15 against the tension of the coil spring 17'.

In the application of the invention, the trailer tongue is inserted between the extensions 7, 8 on the plate, the rocking bolt 15 is gripped on the handle portion, and raised until the extension pin 21 is free of the space between the said extensions, whereby the tongue of the trailer is inserted therebetween and being provided with the conventional opening is secured to the tongue 4 by the locking pin 21.

In the event it is desired to uncouple the trailer from the tongue 4, the reverse operation is carried out, whereupon the tongue 4 may be dropped, and it will rest on the stand or spring 9 without injuring the parts thereof.

It is thought that the present embodiment of the invention has been disclosed in considerable detail merely for the purpose of exemplification, since in actual practice it attains the features of advantage enumerated as desirable in the statement of the invention and the above description.

It is to be understood that by describing in detail herein any particular form, structure, or arrangement, it is not intended to limit the invention beyond the terms of the several claims, or the requirements of the prior art.

Having thus described our invention, what we claim as new is:—

1. A hitch of the character described including a vehicle tongue, a pair of plates anchored to the upper and lower faces of the tongue, said plates having vertically apertured spaced extensions on their ends, projecting rearwardly of the free end of the tongue, a spring held substantially angular-shaped bolt rotatably journaled through the plates and tongue, said bolt formed with a depending extension pin adapted for extending through said apertured extensions for coupling a trailer to the tongue, and a depending U-shaped frame secured to the tongue to form a stand for the tongue and a limit stop for the locking bolt.

2. A hitch of the character described including a vehicle tongue, a pair of plates anchored to the upper and lower faces of the tongue, said plates having vertically apertured spaced extensions on their ends, projecting rearwardly of the free end of the tongue, a retractile substantially angular-shaped bolt rotatably journaled through the plates and tongue, said bolt formed with a depending extension pin adapted for extending through said apertured extensions for coupling a trailer to the tongue, a depending U-shaped frame secured to the tongue to form a stand for the tongue, and said U-shaped frame disposed in an upright position with the bight portion thereof disposed in alinement with the vertical leg of the bolt to form a stop for the bolt.

In testimony whereof we affix our signatures.

NELLARD R. STENBERG.
EINAR ANDERSON.